United States Patent
Murphy et al.

[11] 3,880,464
[45] Apr. 29, 1975

[54] DOUBLE FOLDING SECOND SEAT

[75] Inventors: Randall T. Murphy, Troy; Omar D. Tame, Taylor; Clifford L. Mortimer, Southfield, all of Mich.

[73] Assignee: Lear Siegler, Detroit, Mich.

[22] Filed: Sept. 24, 1973

[21] Appl. No.: 400,295

[52] U.S. Cl.................. 297/326; 297/331; 297/379
[51] Int. Cl............................................. B60n 1/04
[58] Field of Search....... 297/14, 15, 315, 331, 340, 297/354, 378, 379, 325, 326

[56] References Cited
UNITED STATES PATENTS

| | | | |
|---|---|---|---|
| 1,747,329 | 2/1930 | Smith | 297/378 X |
| 2,859,798 | 11/1958 | Carte | 297/321 |
| 3,338,633 | 8/1967 | Jackson | 297/379 |
| 3,449,012 | 6/1969 | Caron | 297/378 X |
| 3,727,976 | 4/1973 | Lystad | 297/340 |

*Primary Examiner*—Francis K. Zugel
*Assistant Examiner*—William E. Lyddane
*Attorney, Agent, or Firm*—Reising, Ethington & Perry

[57] ABSTRACT

A vehicle seat is provided which can be conveniently stowed when not in use. The vehicle seat includes a seat bottom mounted for pivotal movement relative to the vehicle floor and a seat back mounted for pivotal movement relative to the seat bottom. To stow the seat, the seat back is folded onto the seat bottom which is then pivoted to the stowed position. When the seat bottom is in its seat forming position a first latch secures it to the vehicle floor; a second latch secures the seat back relative to the seat bottom when the seat back is in its seat forming position. An interlock between the first and second latches obviates latching by the second latch until and unless the first latch has been latched. This sequential latching insures that the seat bottom is secured to the vehicle floor at all times during which the seat back is latched in its seat forming position.

13 Claims, 6 Drawing Figures

DOUBLE FOLDING SECOND SEAT

BACKGROUND OF THE INVENTION

1. Field of the Invention:

This invention relates to double folding vehicle seats and latches therefor.

2. Description of the Prior Art:

Vehicle seats which can be converted into beds are well known in the prior art. To convert such seats into beds, the seat bottoms and/or seat backs are folded to their bed forming positions. Similarly, double folding vehicle seats, permitting the seats to be folded to stowed positions; are well known. Seat mechanisms providing both these features are illustrated in the U.S. Patent to Carte U.S. Pat. No. 2,859,798. Such prior art seats, as exemplified in Carte, include appropriate linkage and locking mechanisms to provide the desired seat operation.

Present day requirements for vehicle seats render many prior art double folding seat designs unacceptable for use in vehicles. Seat belt requirements, and the current seat latching requirements for vehicle manufacture, cannot be met by many of the known folding seat designs. Movement of the seat during operation of the vehicle, as during periods of hard braking, must be limited by appropriate latches, and seat belts must be provided for use with the seat. Accordingly, it is now essential that the seat bottom be latched to the floor, and that the seat back be latched in its seat forming position.

SUMMARY OF THE INVENTION

In the present invention a double folding seat is provided including a first latch to latch the seat bottom to the vehicle floor and a second latch to latch the seat back to the seat bottom. The two latches are provided with an interlock to obviate latching by the second latch until and unless the first latch is latched. In this manner, assurance is provided that the seat unit is secured to the vehicle floor at all times when the seat back is latched relative to the seat bottom. A structural member adapted for the attachment of seat belts is provided as part of the seat frame.

The instant double folding seat and latch includes a seat bottom mounted for pivotal movement relative to the vehicle floor and a seat back mounted for pivotal movement relative to the seat bottom. Accordingly, when it is desired to stow the seat, the seat back is merely folded onto the seat bottom which is then folded to the stowed position. When the stowed seat is required for use, the seat bottom is pivoted to the seat forming position automatically setting a first latch. This latch includes a first pawl pivotally carried by the seat bottom and a first pin carried by a pin striker plate secured to the vehicle floor. AN alignment pin, also carried by the pin striker plate, sets the first pawl by cam action, for latching engagement with the first pin. However, a bias spring biases the first pawl away from the first pin thereby precluding latching engagement of the pawl and pin. When the seat back is placed in its seat forming position, the first pawl is moved into latching engagement with the first pin by a second pin which engages the first pawl and pivots that pawl into latching engagement with the first pin. This second pin is carried by the seat back, and it is part of a second latch which automatically latches the seat back to the seat bottom when the seat back is pivoted to its seat forming position. This second latch also includes a second pawl pivotally carried by the seat bottom. A spring biases the second pawl toward latching engagement with the second pin. When the second latch is unlatched, by manually pivoting the second pawl out of latching engagement with the second pin, and the seat back pivoted away from its seat forming position, the first pawl is automatically moved to an unlatched position by the bias spring noted above. At this time the seat bottom can be pivoted relative to the vehicle floor, or the first latch can be relatched by returning the seat back to its seat forming position. If the first latch is jammed, or if some foreign object prevents latching of the first latch, the second pin will strike the first pawl, but will not latch the first latch, which interference precludes latching of the second latch. This interlock prevents latching of the second latch until and unless the first latch is latched.

DESCRIPTION OF THE DRAWINGS

The instant invention can be best understood by reference to the following description of a preferred embodiment taken in conjunction with the accompanying drawings in which.

DESCRIPTION OF THE PREFERRED EMBODIMENT

Figure 1:
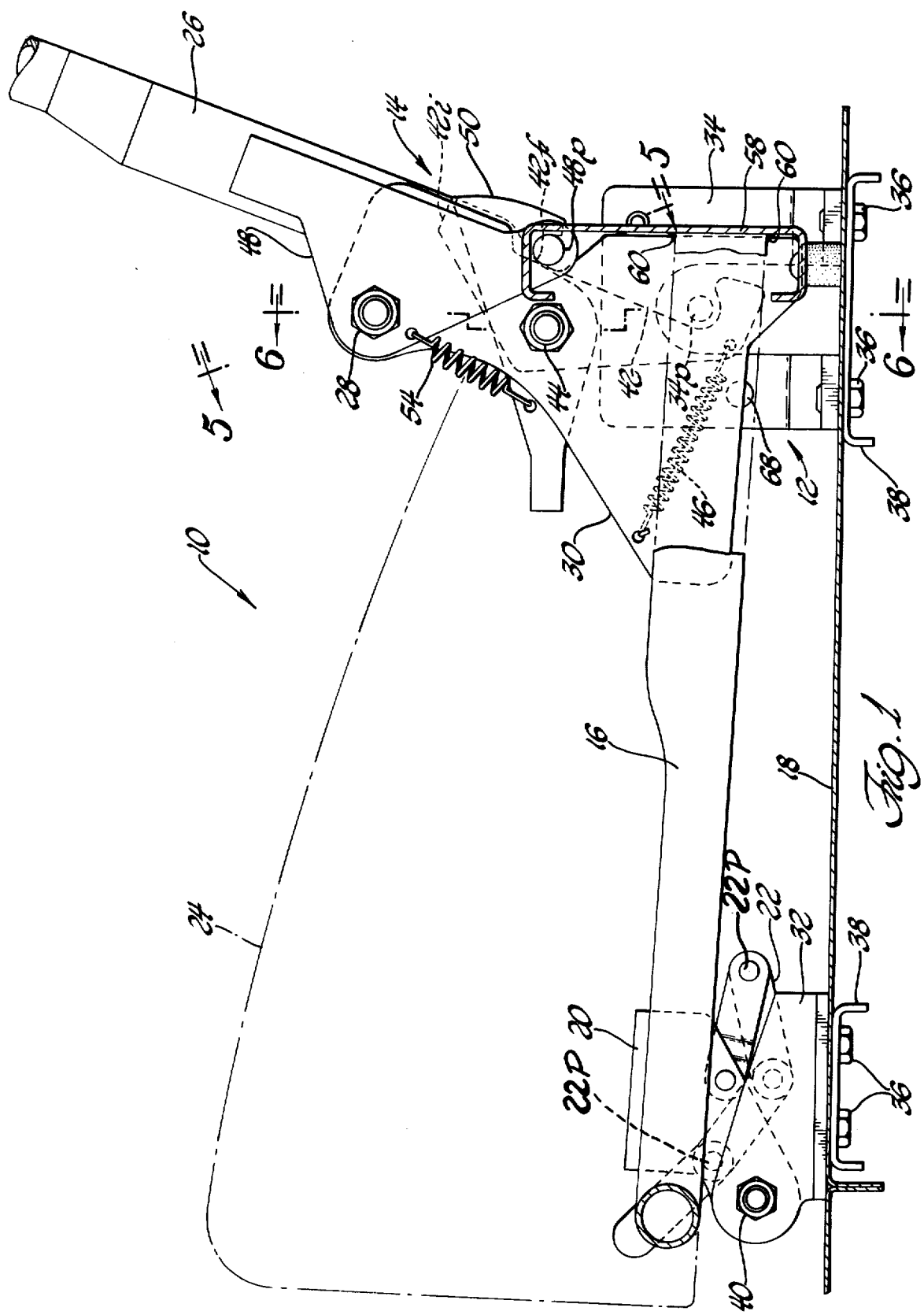
FIG. 1 is a partial sectional view of the double folding seat and latch mechanism of the present invention latched in its seat forming position.

Reference should now be made to the drawings and in particular to FIG. 1 wherein a double folding seat generally designated 10 is shown with first and second latch means respectively designated 12 and 14 made in accordance with the present invention. The vehicle seat 10 includes a seat bottom frame member 16 mounted for pivotal movement relative to the vehicle floor 18 through a mounting bracket 20. Over-center linkage 22 provides toggle-action to retain the seat 10 in the stowed position. A seat bottom cushion is indicated in the drawing by a phantom line 24. A seat back frame member 26 is mounted for pivotal movement relative to the seat bottom frame member 16 by a bolt 28 which connects the seat back frame member 26 to a bracket 30 attached to the seat bottom frame member 16. The seat bottom frame member 16 is a generally tubular member with flattened sections for attachment to various elements, for example, the seat bottom frame member 16 is flattened in the region where the bracket 30 is attached to the member 16. The bracket 30 is welded to the member 16, although other attaching means could obviously be substituted for the weld of this embodiment.

The seat 10 is mounted to the vehicle floor 18 by first and second brackets 32 and 34 which are respectively secured to the vehicle floor by bolts 36. Reinforcing brackets 38 are included to strengthen the attachment between the vehicle floor 18 and the seat 10. Bracket 32 is pivotally connected with bracket 20 by a bolt 40 to permit the seat 10 to be pivoted to its stowed position. As noted above, the linkages 22 provides an over-toggle lock to retain the seat 10 in the stowed position. The orientation of the linkage 22 in the over-toggle position is shown by a dashed line in the drawing. This over-toggle is readily broken by the application of manual force at the pivot 22P when it is desired to return the seat from the stowed to the seat forming position.

Figures 5, 6:
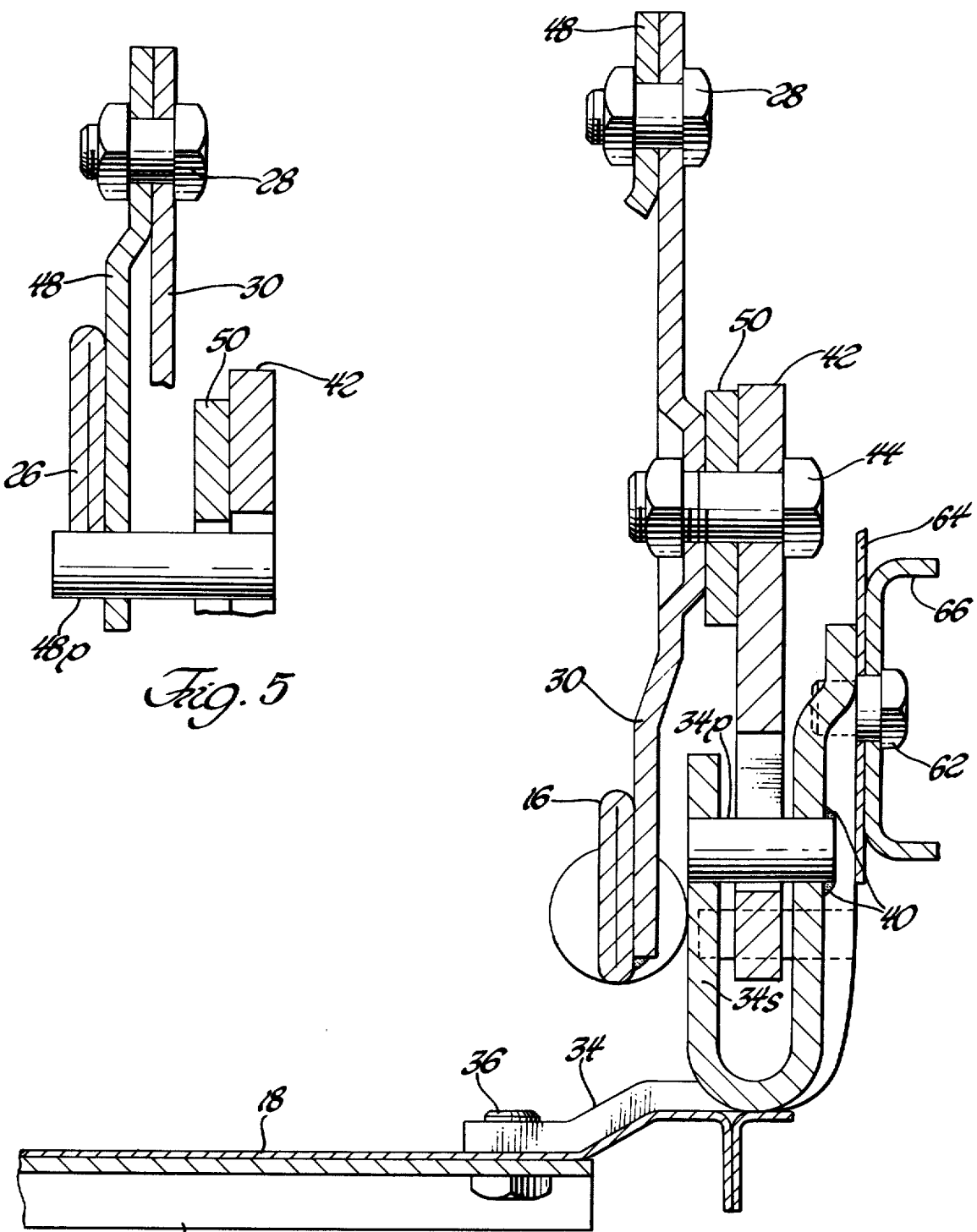
FIG. 5 is a partial sectional view of the seat and latch mechanism shown in FIG. 1 taken along the line 5—5 of FIG. 1.
FIG. 6 is a partial sectional view of the seat and latch mechanism of FIG. 1 taken along the line 6—6 of FIG. 1.

The latch means generally designated 12 latches the seat bottom frame member 16 in its seat forming position. As best shown in FIG. 6 the bracket 34 includes a generally U-shape portion 34S and a pin 34P welded to the portion 34S, for example, along a weld bead 40. A pawl 42 is pivotally mounted on the bracket 30 by a bolt 44. The pin 34P and the pawl 42 are the latching or engaging members of the latch means 12 which secures the seat bottom frame member 16 in its seat forming position. A spring 46 continually applies an unlatching bias force to the pawl 42; however, as explained more completely hereinafter, the pawl 42 cannot disengage the pin 34P if the seat back frame member 26 is in its seat forming position.

The seat back frame member 26 comprises a generally tubular member flattened for attachment to a bracket 48. As illustrated in FIG. 6, the bracket 48 is pivotally connected to the bracket 30 by the bolt 28. The bracket 48 carries a pin 48P included in the second latch means 14. A pawl 50 pivotally connected to the bracket 30 by the bolt 44 is adapted to engage the pin 48P to latch the second latch means 14. A spring 54 continuously biases the pawl 50 toward engagement with the pin 49P. Manual force is applied to the pawl 50 to overcome the spring 54 when the latch means 14 is unlatched. The pin 48P can be attached to the bracket 48 by welding or by any other suitable attachment means.

A structural cross rail member 58 is welded to the seat bottom frame member 16 along a weld bead 60. This cross rail spans the lateral distance of the seat bottom frame, and it forms a rigid part of that frame. The cross rail 58 is adapted for the attachment of seat belts for use in conjunction with the seat 10. Seat belts can be secured directly to the rail. It should be appreciated that the latch 12 provides a rigid connection, or anchor, of the seat belts to the vehicle floor.

The bracket 34 is secured to the side of the vehicle by a bolt 62 extending through a portion of the vehicle side wall 64. A reinforcing bracket 66 adds structural strength to this attachment.

Figure 2:
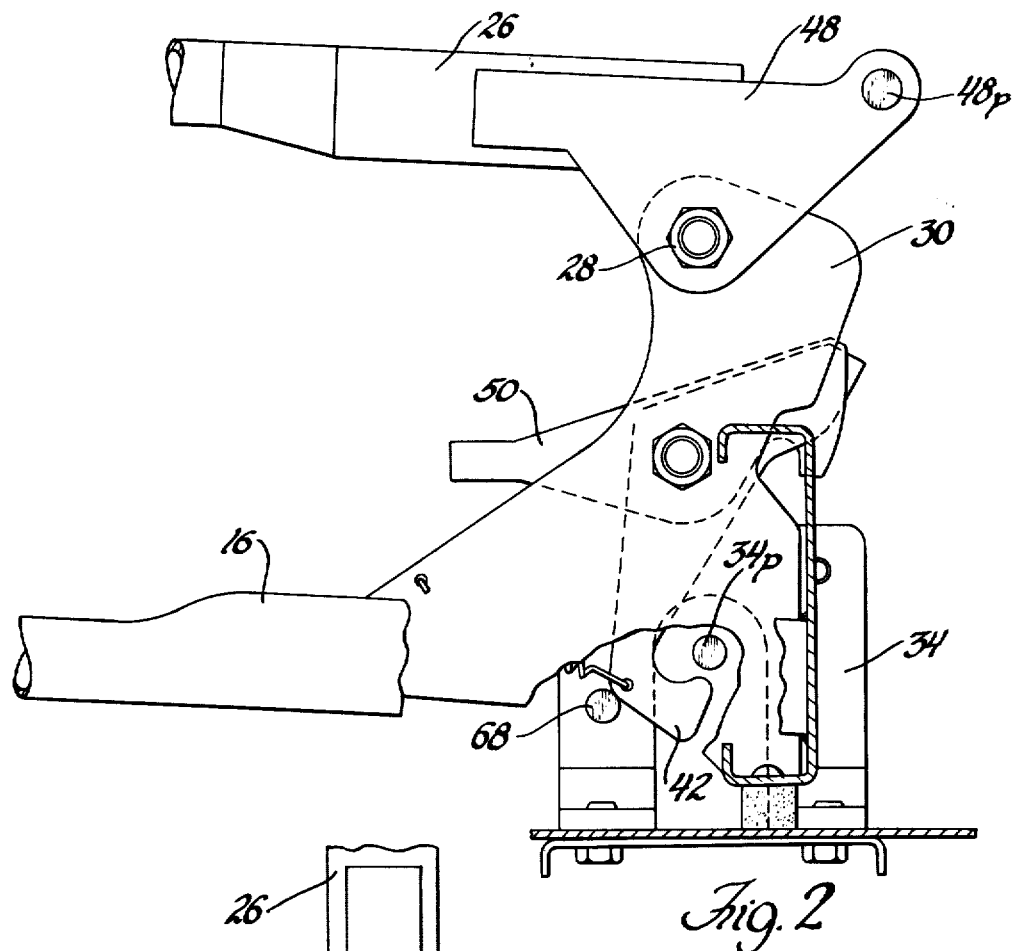
FIG. 2 is a partial sectional view of the double folding seat and latch mechanism of the present invention unlatched with the seat back folded forward over the seat bottom.
Figure 3:
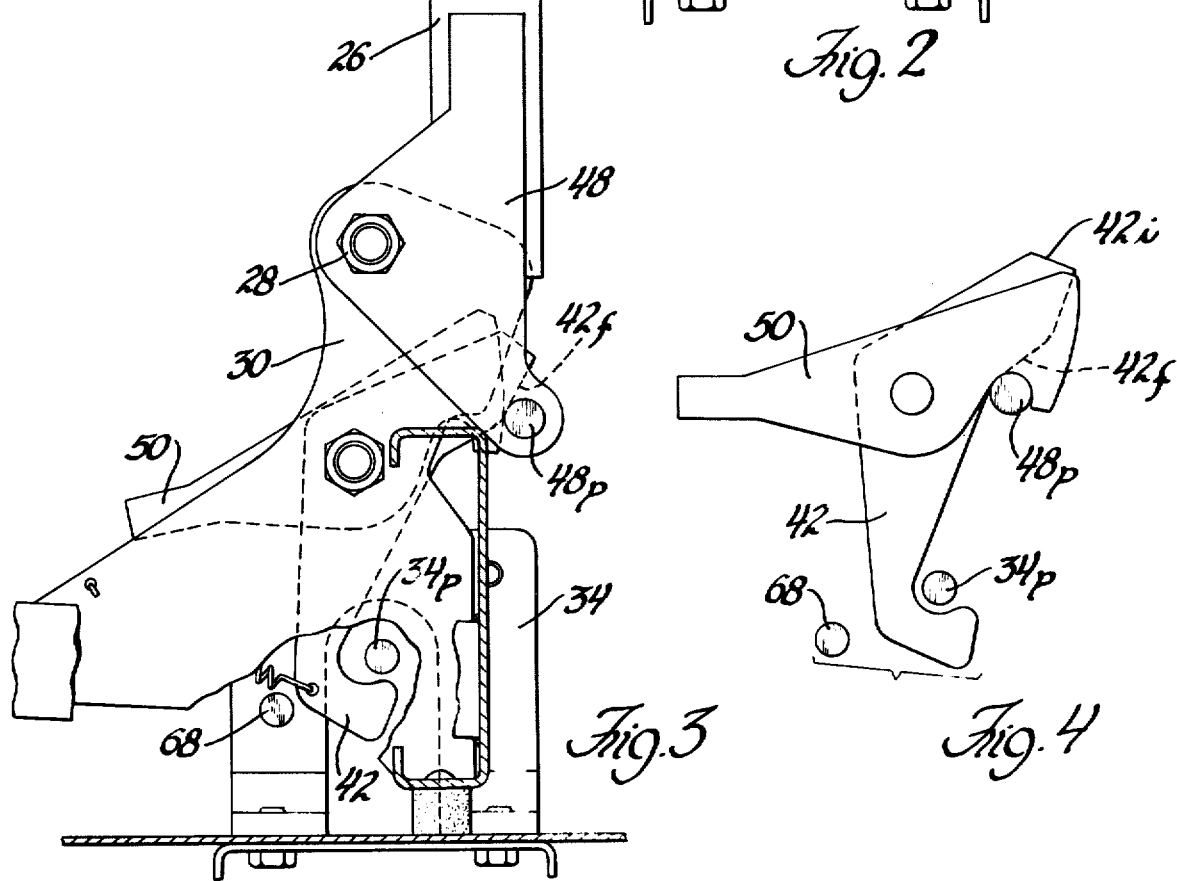
FIG. 3 is a partial sectional view of the double folding seat and latch mechanism of the present invention unlatched with the seat back in an intermediate position.
Figure 4:
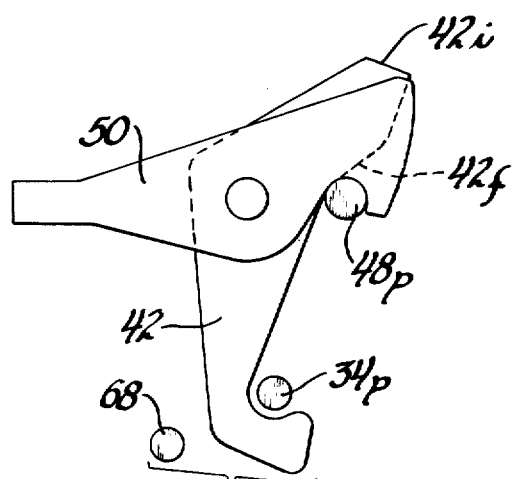
FIG. 4 is a partial sectional view of the pins and pawls comprising the latch mechanism of the present invention.

In FIG. 1 both the first and second latch means are in their latched positions. To fold the seat to its stowed position the pawl 50 is manually rotated counterclockwise against the force of spring 54 until the pawl 50 disengages the pin 48P. At this point the second latch means 14 is unlatched and the seat back frame member 26 can be pivoted counterclockwise relative to the seat bottom frame member 16 as is best illustrated in FIGS. 2 and 3. As the seat back frame member 26 is pivoted counterclockwise the spring 46 simultaneously causes clockwise rotation of the pawl 42 to disengage the first latch means 12. The pawl 42 includes a section 42F which engages and follows the pin 48P until the pawl 42 engages a pin 68 attached to the bracket 34, for example, by welding. The manner in which pin 68 engages pawl 42 to limit rotation by pawl 42 is best illustrated in FIG. 2. The pin 68 limits clockwise rotation by the pawl 42, but the first latch means is unlatched before the pin 68 interferes with the rotation of the pawl 42. Accordingly, the seat bottom frame member 16 can be pivoted to the stowed position after the seat back frame member 26 is pivoted from its seat forming position.

When the seat 10 is in its stowed position the toggle linkage 22 locks the seat in this position. When the toggle is broken the seat can be pivoted back to the seat forming position. As the seat bottom approaches its seat forming position the pawl 42 engages the pin 68, as illustrated in FIG. 2, to position the pawl 42 for latching engagement with the pin 34P. However, the pawl 42 is not in actual latching engagement with the pin 34P until the seat back is placed in its seat forming position. The spring 46 retains the pawl 42 in its unlatched position until the pin 48P engages the portion 42F of the pawl 42 to move the pawl 42 into latching engagement with the pin 34P. After the pawl 42 engages the pin 34P, the pawl 50 engages the pin 48P and automatically latches by force of the spring 54. If the first latch 12 is jammed, or if some foreign object prevents latching of the first latch, the pin 48P will be prevented from reaching the position required for latching with the pawl 50. The pin 48P will engage the surface 42I of the pawl 42 which interferes with further movement by the pin 48P. It should be appreciated that this interaction between pawl 42 and pin 48P comprises an interlock means effective to preclude latching of the second latch means until and unless the first latch means is latched.

Although the foregoing has proceeded in terms of a particular preferred embodiment, it is to be understood that various modifications and changes could be engrafted thereon by one skilled in the art within the spirit and scope of the appended claims.

The embodiments of the invention in which an exclusive property or privilege is claimed are defined as follows:

1. In a vehicle seat including a seat bottom frame member adapted to be mounted for pivotal movement relative to a vehicle floor and a seat back frame member connected with the seat bottom frame member and pivotal relative to the seat bottom frame member, the improvement comprising: a first latch means connected with said seat bottom frame member for latching said seat bottom frame member in its seat forming position, a second latch means connected with said seat back frame member for latching said seat back frame member in its seat forming position, and interlock means connected with said second latch means for preventing said second latch means from latching until and unless said first latch means is latched.

2. A vehicle seat as in claim 1 wherein said first latch means is adapted to latch said seat bottom frame member to the vehicle floor.

3. A vehicle seat as in claim 2 wherein said second latch means is adapted to latch said seat back frame member to the vehicle floor.

4. A vehicle seat as in claim 3 wherein said second latch means is adapted to latch said seat back frame member to the vehicle floor by latching said seat back frame member to said seat bottom frame member.

5. A vehicle seat as in claim 4 wherein said first latch means includes a first pawl pivotally carried by said seat bottom frame member and a first pin adapted to be secured to the vehicle floor and engageable with said first pawl.

6. A vehicle seat as in claim 5 wherein said second latch means includes a second pawl pivotally carried by said seat bottom frame member and a second pin secured to said seat back frame member and engagable with said second pawl.

7. A vehicle seat as in claim 6 wherein said first pawl interferes with movement by said second pin unless said first pawl is aligned for latching engagement with said first pin whereby said seat back frame member is prevented from being positioned in its seat forming position and said second latch means is prevented from latching until and unless said first latch means is latched.

8. A vehicle seat as in claim 7 including a third pin disposed on said vehicle seat to displace said first pawl when said seat bottom frame member is positioned in its seat forming position such that said first pawl is aligned for latching engagement with said first pin by said third pin.

9. A vehicle seat as in claim 8 including first and second springs respectively connected between said first and second panels and said vehicle seat to respectively bias said first and second pawls out of and into latching engagement with said first and second pins.

10. A vehicle seat as in claim 9 including a structural cross rail member connected with said seat bottom frame member and adapted for the attachment of seat belts for use in conjunction with said vehicle seat.

11. A latch for a vehicle seat including a seat bottom frame member adapted to be mounted for pivotal movement relative to a vehicle floor and a seat back frame member connected with the seat bottom frame member and pivotal relative to the seat bottom frame member comprising: a first latch means adapted to be connected with said seat bottom frame member for latching said seat bottom frame member in its seat forming position, a second latch means adapted to be connnected with said seat back frame member for latching said seat back frame member in its seat forming position, and interlock means connected with said second latch means for preventing said second latch means from latching until and unless said first latch means is latched.

12. A latch as in claim 11 wherein said first latch means includes a first pawl and a first pin engageable with said first pawl and said second latch means includes a second pawl and a second pin engageable with said second pawl.

13. A latch as in claim 12 wherein said first pawl interferes with movement by said second pin to prevent said second latch means from latching until and unless said first latch means is latched.

* * * * *